3,318,267
ROTARY CUTTER

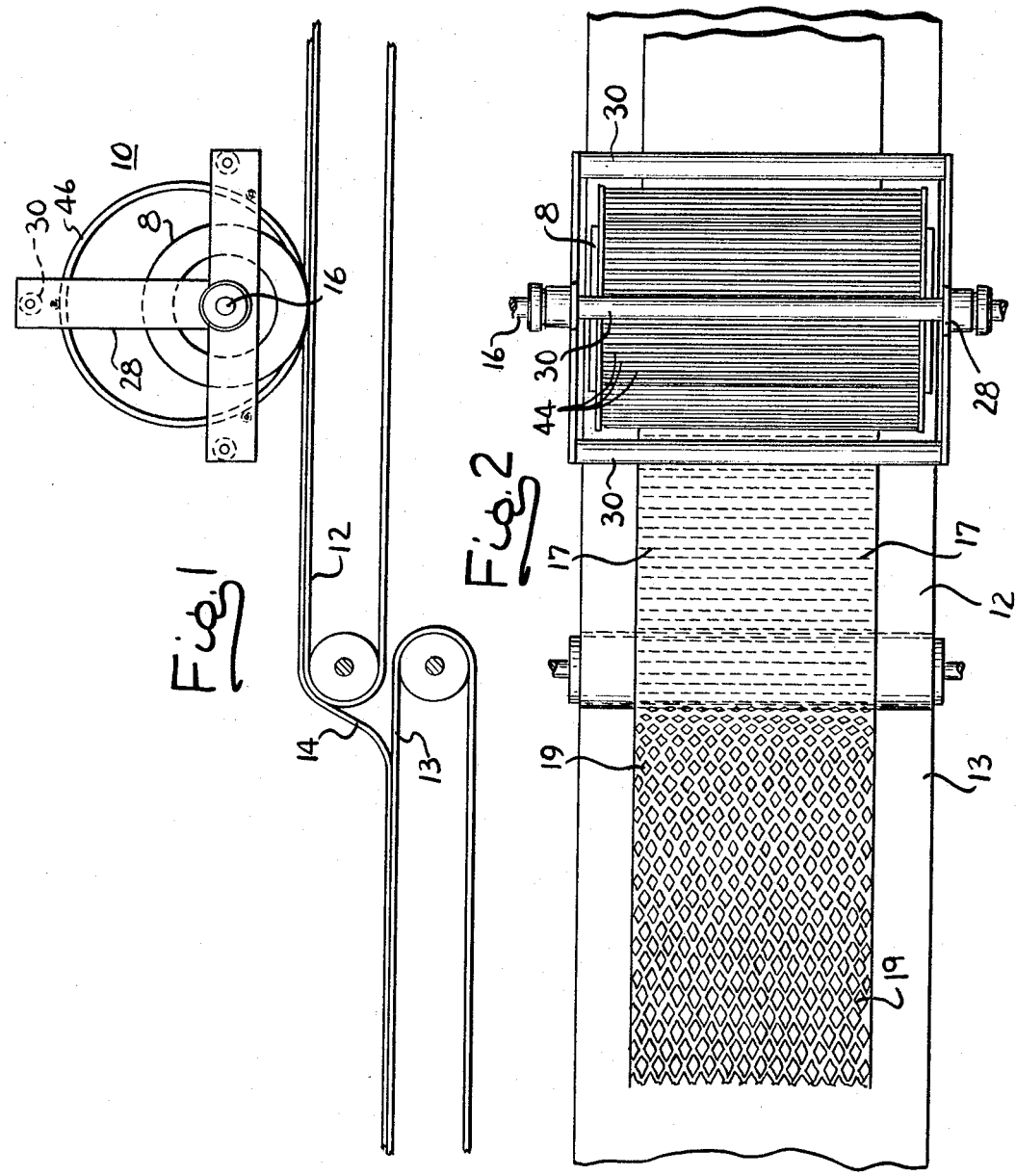

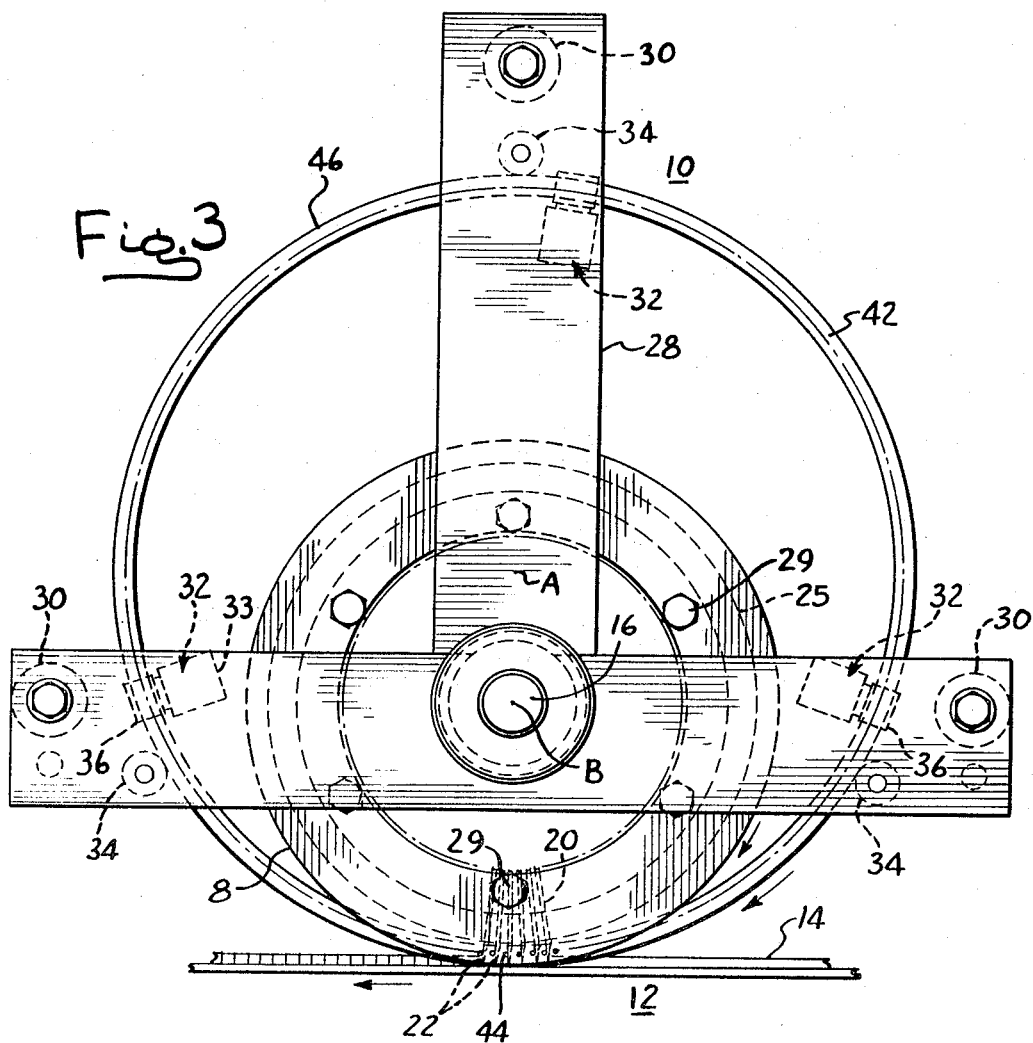

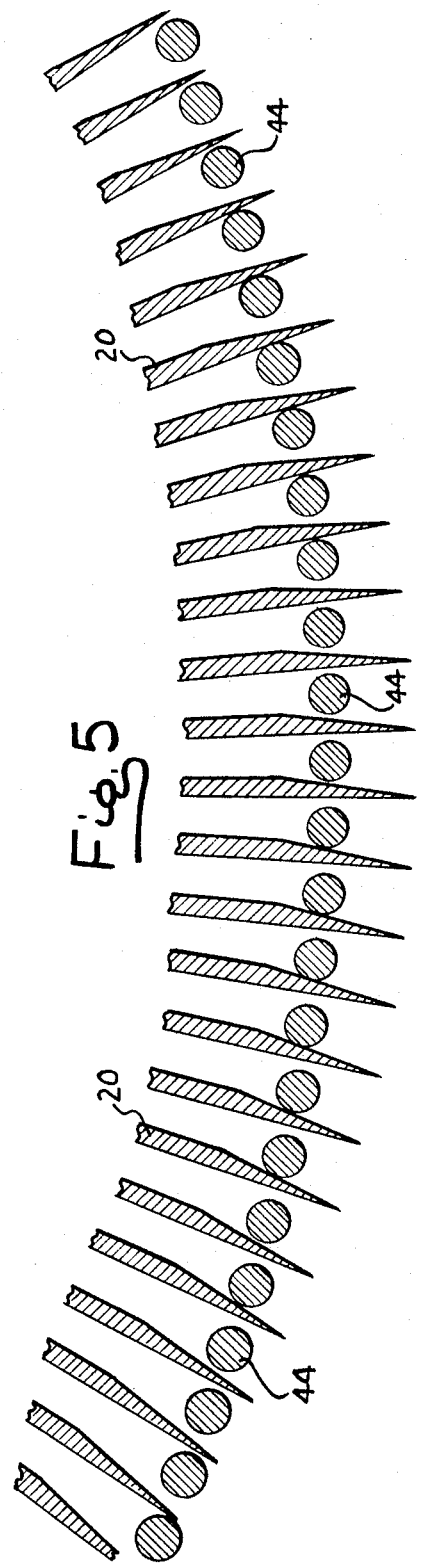
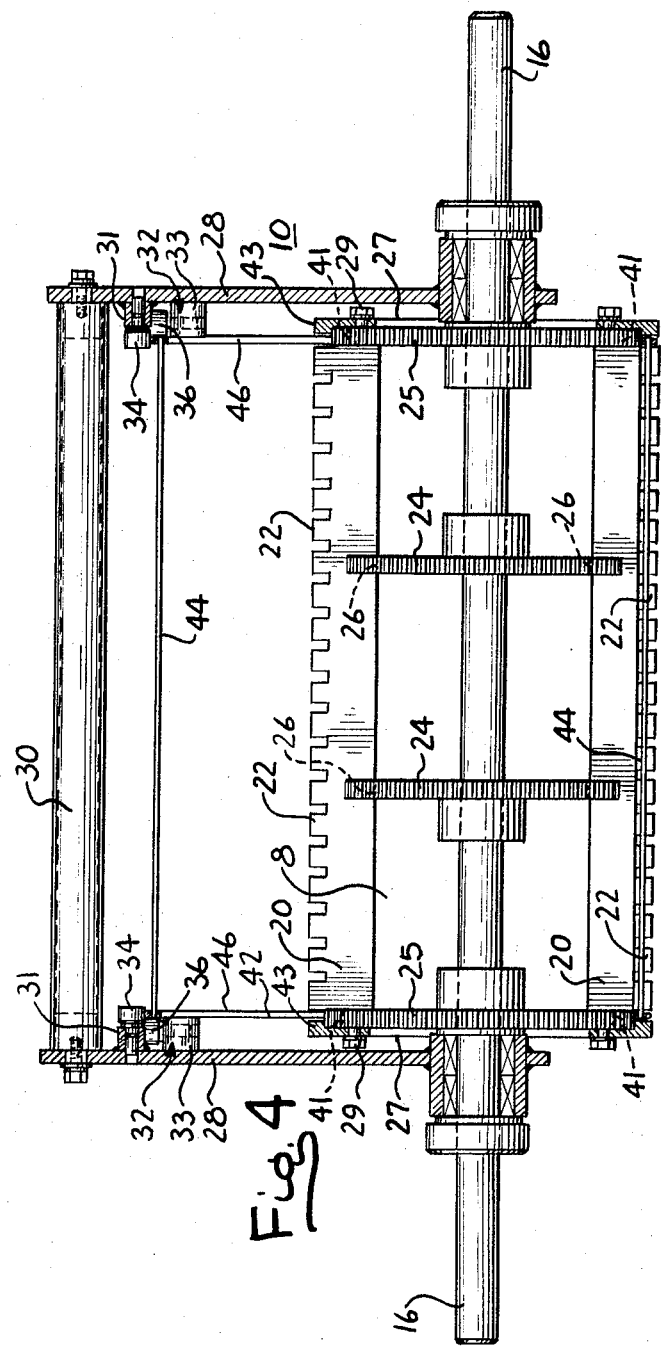

Mariano V. Artiaga, Chicago, Glen Tranter, Lombard, Arthur Storrie, Chicago, Hans Van Eikeren, Lincolnwood, and Andrew Wolf, Deerfield, Ill., assignors to Kitchens of Sara Lee, Inc., Chicago, Ill., a corporation of Maryland Filed Nov. 9, 1964, Ser. No. 409,660
9 Claims. (Cl. 107—69)

This invention relates in general to a system for forming diamond shaped openings in a sheet of material.

Accordingly, it is an object of this invention to provide apparatus for first cutting uniform slits in a continuous sheet of material travelling beneath and brought into operable contact therewith and then expanding the sheet of material to permit the diamond shaped openings to form.

It is another object of this invention to provide a rotary cutter for cutting uniform slits in a sheet of material such as a layer of dough travelling beneath and brought into operable contact therewith.

It is another object of this invention to provide a rotary cutter having a plurality of radially extending spaced blades for cutting uniform slits in a layer of dough travelling beneath and brought into operable contact therewith and which is provided with a stripper mechanism to remove any of the dough that may adhere to the blades.

It is another object of this invention to provide apparatus for expanding the sheet of material after slits have been formed therein to cause the diamond shaped openings to form.

In the illustrated preferred embodiment of the invention a rotary cutter for forming uniform slits in a sheet of material, such as dough, is provided. Also a pair of conveyors operating at different speeds are arranged to expand the dough after the slits have been formed therein so as to form the diamond shaped holes therein. The rotary cutter is positioned over the first of said conveyors carrying a continuous sheet of dough and is mounted for free rotation about its own axis and is moved in its rotary direction by the forward movement of the sheet of dough. The rotary cutter comprises a plurality of radially extending blades having blade teeth formed therein. Alternate of the radially extending blades have aligned blade teeth and intermediate radially extending blades have aligned blade teeth but the teeth of the alternate blades are not aligned with the teeth of the intermediate blades and are misaligned by one-half of the pitch of the blade teeth. Suitable mounting means are provided to insure the free rotation of the rotary cutter. A stripper mechanism comprising a plurality of cylindrically arranged bars connected at their ends by a pair of annular rings and forming a cylindrical cage having a greater diameter than the diameter of the cylinder defined by the radially extending blades is associated with said blades. The stripper mechanism bars are positioned so that the rotary blades will move the bars in a rotational direction and the movement of the bars with respect to the radially extending blades is such as to remove any dough, for example, that may adhere between adjacent blades so that no dough will stick between the blades and be carried upward with the blades after the slits have been cut in the dough. After the slits have been formed in the sheet of dough the slitted dough is delivered to a second conveyor positioned below the first conveyor and travelling at a greater speed than the first conveyor. The dough expands as it travels from the first conveyor to the second conveyor and the slits form into diamond shaped openings.

Other objects, features, and advantages of this invention will become clearer if the following is viewed in light of the drawings of which:

FIG. 1 is a partial diagrammatical side elevational view of a rotary sheet slitter and conveyor system forming a preferred embodiment of the invention;

FIG. 2 is a top view of the embodiment of the invention illustrated in FIG. 1;

FIG. 3 is a side elevational view of the rotary cutter utilized in the preferred embodiment of the invention illustrated in FIGS. 1 and 2;

FIG. 4 is a cross-sectional view partially in elevation of the rotary cutter illustrated in FIG. 3; and FIG. 5 is a diagrammatic representation of the relative movement of the radially extending blades and the stripper mechanism bars of the rotary cutter illustrated in FIGS. 3 and 4;

Referring now to FIG. 1, there is illustrated a slit forming apparatus generally designated as 10, a first conveyor belt designated as 12, a second conveyor belt generally designated as 13, and a sheet of dough designated as 14. The slit forming apparatus 10 is arranged and positioned above the first conveyor belt 12 to cut a plurality of uniform slits in a sheet of dough 14 passing underneath. After the sheet of dough 14 has slits 17 formed therein as indicated in FIG. 2 the slitted sheet of dough is delivered to the second conveyor belt 13 positioned below the first conveyor belt 12 and adapted to travel at a faster speed than the first conveyor belt 12. The slits 17 open up as the sheet of dough 14 travels from the first to the second conveyor belts 12 and 13, respectively, as shown in FIG. 2, and diamond shaped holes 19 appear in the sheet of dough 14.

The conveyor belts 12 and 13 can be provided by one skilled in the art and the slit forming apparatus 10 is explained in detail and reference is made to FIGS. 3 and 4. The slit forming apparatus 10 includes a rotary cutter 8 mounted on its axial shaft 16.

The rotary cutter 8 comprises a plurality of radially extending blades 20. The radially extending blades 20 are spaced apart and extend around the entire periphery of the rotary cutter 8 and their spacing may be provided as desired. Each radially extending blade 20 has a plurality of blade teeth 22 formed therein and again the number of teeth in each blade is a matter of choice. Alternate radially extending blades 20 positioned in the rotary cutter 8 have their blade teeth 22 positioned in alignment. Intermediate radially extending blades 20 also have their blade teeth 22 positioned in alignment but the teeth of the alternate and intermediate blades 20 are not aligned and are spaced laterally from each other by one-half of the pitch of the blade teeth 22.

The radially extending blades 20 are themselves mounted on two internal hubs 24 and two end hubs 25 and these hubs are locked to the central shaft 16 in any known manner and rotate therewith. Each of the intermediate hubs 24 has a plurality of radially extending blade supporting slots 26 formed therein so as to properly position and space the radially extending blades 20. The end hubs 25 have corresponding slots 41 formed therein for the purpose of securing the blades 20 in position. Both ends of each blade 20 are notched to fit the slots 41 and the blades 20 are locked in the slots 41 by two clamp rings 27. The clamp rings 27 are removably secured to the end hubs 25 by any known means and as illustrated are secured thereto by a plurality of machine screws 29. The clamp rings 27 have an annular portion 43 thereof which extends over the slots 41 in the end hubs 25 thereby maintaining the blades 20 in a tight secure position in the rotary cutter 8.

A pair of inverted T-shaped mounting brackets 28 are positioned on the axial shaft 16 as best illustrated in FIGS. 3 and 4. Three connector and spacer bars 30 are utilized to interconnect and properly space the inverted T-shaped mounting brackets 28, as best seen in FIGS. 3 and 4. The connector and spacer bars 30 can be secured to the inverted T-shaped mounting brackets 28 by any known means. Positioned on the inverted T-shaped mounting brackets 28 and adjacent the connector and spacer bars 30 are the stripper mechanism rotary guide brackets 32. The stripper mechanism rotary guide brackets 32 are each comprised of a vertical roller housing 31 and a horizontal roller housing 33 adapted to rotatably retain a vertical roller 34 and a horizontal roller 36, respectively. There are a total of six stripper mechanism guide brackets 32, three for each inverted T-shaped mounting bracket 28 and these brackets 32 are spaced apart to prevent any motion except rotational of the stripper mechanism 42 positioned thereby as will be seen.

The stripper mechanism 42 is comprised of a plurality of circular rods 44 spaced from one another and extending around the rotary cutter 8 and preferably made of metal. The circular rods 44 are connected together through annular end rings 46. The circular rods 44 have a diameter less than the distance between adjacent radially extending blades 20. The stripper mechanism 42 is so mounted in the stripper mechanism guide brackets 32 that it can only move in a rotational direction and is so positioned that its axis of rotation is in the same vertical plane as that of the axis of rotation of the rotary cutter 8 which is at B. However, the axis of rotation in the stripper mechanism 42 is at A and spaced directly above that of the rotary cutter 8.

*Operation*

In the preferred embodiment of the invention, a continuous sheet of dough 14 is made to travel past the radially extending rotatable blades 20 of the rotary cutter 8 by means of a first conveyor belt 12. The blades are arranged so that the lowest point that any blade can reach with respect to the belt is when it is perpendicular to the surface of the conveyor belt at which time it will just touch the upper surface of the belt 12. The leading edge of the sheet of dough contacts one of the blades 20 and pushes the particular blade contacted to the left, as best viewed in FIGS. 1 and 3. This force exerted by the leading edge of the sheet of dough on the contacted blade 20 rotates the rotary cutter 8 about its axis at B and consequently rotates a following adjacent blade 20 into contact with a trailing portion of the sheet of dough. This following blade 20 pierces the trailing portion of the sheet of dough and the sheet of dough then exerts an additional force on the following blade to aid in pushing the blades toward the left, as viewed in FIGS. 1 and 3, and therefore adding to the force that is rotating the rotary cutter 8 about its axis B, which in turn rotates a subsequent blade 20 into a subsequent trailing portion of the sheet of dough and so on as can be readily understood.

There is a tendency, depending upon the thickness and consistency of the dough, for the dough which has had the slits formed therein by the radially extending blades 20, to begin to ride up with the blades 20. After the blades 20 have penetrated through the dough and have passed directly under the vertical axis of the rotary cutter 8, the blades 20 begin to ascend in a vertical direction and the dough itself has a tendency to stick to the blades 20 and begins to ride up with the blades 20. To avoid such a situation, the stripper mechanism 42 has been provided and the stripper mechanism 42 is rotated around its axis A by the force exerted on the circular rods 44 by their associated blades 20. The vertical rollers 34 and the horizontal rollers 36 of the mounting brackets 32 are positioned to insure that the stripper mechanism 42 can only move in a rotational direction.

The diameter of the stripper mechanism 42 is greater than the diameter of the rotary cutter 8 as can be clearly seen in FIG. 1. The circular rods 44 of the stripper mechanism 42 move away from the conveyor belt 12 at a slower rate than the radially extending blades 20 after a radially extending blade 20 and its associated circular rod 44 have rotated past the vertical axis of the rotary cutter 8.

FIG. 5 diagrammatically illustrates the relative motion between the blades 20 and the circular rods 44. Inasmuch as the distance of the circular rods 44 from axis A is greater than the radius of curvature of the blades 20, the blades 20 move toward and away from the conveyor belt 12 at a greater speed than do the rods 44 and the blades 20 and the rods 44 will push any adhered dough from between the blades 20 as the blades 20 and the rods 44 rotate away from the conveyor belt 12.

After the slits 17 are formed in the sheet of dough 14 as shown in FIG. 2 the slitted sheet of dough is delivered to the second conveyor 13 positioned below the first conveyor 12. The second conveyor 13 is run at a faster speed than the first conveyor 12 and this is done to cause the slits 17 to open up and form the diamond shaped holes 19 as shown in FIG. 2. The expansion of the dough brings the slits 17 into prominence as substantially diamond shaped holes 19. Such dough is used in apple cakes and the like.

It should of course be understood that the invention may be utilized to cut openings in materials other than dough where appropriate. Similarly, the blades may be shaped, arranged and positioned to make cuts and patterns other than the slits and diamond-shape lattice work illustrated.

What has been described is what is considered to be the preferred embodiment of the invention, however, many alterations and modifications can be made without departing from the scope of this invention and it is intended that the invention be limited only by the following claims.

We claim:
1. A machine for cutting patterns of desired configuration in a sheet of material comprising:
a plurality of spaced radially extending cutting elements adapted for rotation about a first axis;
means for delivering a sheet of material into contact with said plurality of elements; and
a plurality of spaced bars connected together to form a cylinder around said elements and adapted for rotation about a second axis vertically spaced from said first axis;
some of said bars extending between some of said elements adjacent said sheet of material;
said elements being arranged to be moved forward by said sheet of material to force the cutting edges of said elements into said material as they rotate to form said patterns therein;
said spaced bars being arranged to be moved forward by said cutting elements so as to rotate therewith.

2. A machine for cutting slits in a sheet of material comprising:
a plurality of spaced radially extending blades adapted for rotation about a first axis;
means for delivering a sheet of material into contact with said plurality of blades; and
a plurality of spaced bars connected together in a cylindrical configuration and adapted for rotation about a second axis positioned in the same vertical plane as said first axis and spaced from said first axis;
some of said bars extending between some of said blades adjacent said sheet of material;
said blades being arranged to be moved forward by said sheet of material to force the cutting edges of said blades into said material as they rotate to form slits therein;
said spaced bars being arranged to be moved forward by said blades so as to rotate therewith.

3. A machine for cutting slits in a sheet of material comprising:
   a plurality of spaced radially extending blades defining a first cylinder having a first diameter adapted for rotation about a first axis;
   means for delivering a sheet of material into contact with said plurality of blades; and a plurality of spaced bars connected together adjacent their opposite ends and defining a second cylinder having a second diameter larger than said first diameter and adapted for rotation about a second axis positioned in the same vertical plane as said first axis and spaced from said first axis;
   some of said bars extending between some of said blades adjacent said sheet of material;
   said blades being arranged to be moved forward by said sheet of material to force the cutting edges of said blades into said material as they rotate to form slits therein;
   said spaced bars being arranged to be moved forward by said blades so as to rotate therewith.

4. A machine for cutting slits in a sheet of material as in claim 3 wherein said plurality of blades have a plurality of teeth formed therein and wherein alternate blades have their teeth aligned and wherein intermediate blades have their teeth aligned but not aligned with the teeth of said alternate blades.

5. A machine for cutting uniform slits in a sheet of dough passing under said machine comprising:
   a rotary cutter;
   a conveyor for delivering a sheet of dough to said rotary cutter;
   said rotary cutter having a plurality of radially extending blades rotatably positioned above said conveyor and extending close enough to said conveyor to extend through said sheet of dough;
   said radially extending blades having a plurality of notched out sections so as to form spaced slits in said sheet of dough;
   alternate of said blades having their notched out sections aligned with one another and intermediate of said blades having their notched out sections not aligned with the notched out sections of said alternate blades;
   said sheet of dough exerting a force on the blades of said rotary cutter to cause said blades to rotate into said sheet of dough; and
   a stripper mechanism surrounding said rotary cutter and comprising a plurality of pusher bars cylindrically arranged and attached to one another by end rings,
   means for mounting said pusher bars for rotatable movement about an axis parallel to the axis of rotation of said rotary cutter,
   said pusher bars extending between and meshing with said blades adjacent said sheet of dough so that said bars and blades rotate together,
   the diameter of the cylinder described by said pusher bars being greater than the diameter of the cylinder described by said radially extending blades,
   whereby said pusher bars unmeshed from said radially extending blades at a point removed from said sheet of dough to strip from said blades any dough tending to accumulate between said blades.

6. A machine for cutting uniform slits in a sheet of dough passing under said machine comprising:
   a rotary cutter;
   a conveyor for delivering a sheet of dough to said rotary cutter;
   said rotary cutter having a plurality of radially extending blades rotatably positioned above said conveyor and extending close enough to said conveyor to extend through said sheet of dough;
   said radially extending blades having a plurality of notched out sections so as to form spaced slits in said sheet of dough;
   alternate of said blades having their notched out sections aligned and intermediate of said blades having their notched out sections not aligned with the notched out sections of said alternate blades;
   said sheet of dough exerting a force on the blades of said rotary cutter to cause said blades to rotate into said sheet of dough;
   and a stripper mechanism surrounding said rotary cutter and comprising a plurality of pusher bars cylindrically arranged and attached to one another by end rings;
   means for mounting said pusher bars for rotatable movement about an axis positioned vertically above the axis of rotation of said rotary cutter;
   said pusher bars extending between and meshing with said blades adjacent said sheet of dough so that said bars and blades rotate together,
   the diameter of the cylinder described by said pusher bars being greater than the diameter of the cylinder described by said radially extending blades,
   whereby said pusher bars unmesh from said radially extending blades at a point removed from said sheet of dough to strip from said blades any dough tending to accumulate between said blades.

7. A machine for cutting uniform slits in a sheet of dough passing under said machine comprising:
   a rotary cutter;
   a conveyor for delivering a sheet of dough to said rotary cutter;
   said rotary cutter having a plurality of radially extending blades rotatably positioned above said conveyor and extending close enough to said conveyor to extend through said sheet of dough;
   said blades being tapered along the side thereof facing said oncoming sheets of dough;
   said radially extending blades having a plurality of notched out sections so as to form spaced slits in said sheet of dough;
   alternate of said blades having their notched out sections aligned and intermediate of said blades having their notched out sections not aligned with the notched out sections of said alternate blades;
   said sheet of dough exerting a force on the blades of said rotary cutter to cause said blades to rotate into said sheet of dough;
   and a stripper mechanism surrounding said rotary cutter and comprising
   a plurality of pusher bars cylindrically arranged and attached to one another by end rings;
   means for mounting said pusher bars for rotatable movement about an axis positioned vertically above the axis of rotation of said rotary cutter;
   said pusher bars extending between and meshing with said blades adjacent said sheet of dough so that said bars and blades rotate together,
   the diameter of the cylinder described by said pusher bars being greater than the diameter of the cylinder described by said radially extending blades,
   whereby said pusher bars unmesh from said radially extending blades at a point removed from said sheet of dough to strip from said blades any dough tending to accumulate between said blades.

8. Apparatus for forming diamond shaped holes in a sheet of material comprising:
   a rotary cutter having a plurality of spaced radially extending blades adapted for rotation about an axis;
   a first conveyor for delivering said sheet of material into contact with said plurality of blades;
   said blades being arranged to be moved forward by said sheet of material to force the cutting edges of said blades into said material as they rotate to form slits therein; and
   a second conveyor positioned adjacent and below said first conveyor and traveling at a higher speed than said first conveyor and receiving said sheet of material from said first conveyor after slits have been formed therein by said blades whereby the slits cut in said sheet of material are expanded into diamond shaped holes.

9. Apparatus for forming diamond shaped holes in a sheet of material comprising:
- a rotary cutter having a plurality of spaced radially extending blades adapted for rotation about an axis;
- a first conveyor for delivering a sheet of material into contact with said blades;
- a plurality of spaced bars adapted for rotation about a second axis vertically spaced from said first axis;
- some of said bars extending between some of said blades adjacent said sheet of material;
- said blades being arranged to be moved forward by said sheet of material to force the cutting edges of said blades into said material as they rotate to form slits therein;
- said spaced bars being arranged to be moved forward by said blades so as to rotate therewith; and
- a second conveyor positioned adjacent and below said first conveyor and traveling at a higher speed than said first conveyor and receiving said sheet of material from said first conveyor after slits have been formed therein by said blades whereby the slits cut in said sheet of material are expanded into diamond shaped holes.

References Cited by the Examiner

UNITED STATES PATENTS

| | | | |
|---|---|---|---|
| 1,007,721 | 11/1911 | Meyer | 83—116 |
| 1,473,377 | 11/1923 | Langston | 83—715 X |
| 2,294,478 | 9/1942 | Norris et al. | 29—6.2 |
| 2,611,298 | 9/1952 | Rowe | 29—6.2 X |
| 2,629,341 | 2/1953 | Rice | 83—308 |
| 3,217,575 | 11/1965 | Anetsberger | 83—115 |

WALTER A. SCHEEL, *Primary Examiner.*

J. SHEA, *Assistant Examiner.*